United States Patent
Tanju et al.

(10) Patent No.: US 7,895,001 B2
(45) Date of Patent: Feb. 22, 2011

(54) SUBSEA CONTROL SYSTEM DIAGNOSIS

(75) Inventors: Baha Tulu Tanju, Humble, TX (US); Hailing An, Houston, TX (US); Ashish Karamchandani, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 12/342,951

(22) Filed: Dec. 23, 2008

(65) Prior Publication Data

US 2010/0161250 A1 Jun. 24, 2010

(51) Int. Cl.
*G21C 17/00* (2006.01)
(52) U.S. Cl. ......................................... 702/34
(58) Field of Classification Search .................... 702/34
See application file for complete search history.

(56) References Cited

U.S. PATENT DOCUMENTS

| 6,834,256 | B2 | 12/2004 | House et al. |
| 2010/0299119 | A1 | 11/2010 | Erikson et al. |

FOREIGN PATENT DOCUMENTS

| JP | 2000199504 A | 7/2000 |
| JP | 2004069647 A | 3/2004 |
| JP | 2006008203 A | 1/2006 |
| JP | 2007534079 A | 11/2007 |
| KR | 1020060009138 A | 1/2006 |
| WO | WO03014851 | 2/2003 |

OTHER PUBLICATIONS

Inge Manfred Carlsen, subsea leak detection-sreening of systems, p. 1-62, Nov. 26, 2006.*
PCT International Search Report and Written Opinion, International Application No. PCT/US2009/068085, May 4, 2010.

* cited by examiner

*Primary Examiner*—Tung S Lau
(74) *Attorney, Agent, or Firm*—Nicholas F. Gallo (57) ABSTRACT

Accurate, dependable methods for analyzing operational parameters of subsea control systems and diagnosis/prediction of failures are provided, in particular, methods for detection of leaking and/or clogging in hydraulic control system using recorded pressure signals and evaluating response communication strength (signal amplitude) of field equipment from, for example, subsea control systems. Prediction of failure(s) allows an opportunity to prepare for intervention to minimize the impact of failure before failure occurs, for example, by ordering equipment, tools and/or scheduling an intervention vessel. Similarly, diagnosing a failure drastically shortens the intervention time.

16 Claims, 5 Drawing Sheets

SUBSEA CONTROL SYSTEM DIAGNOSIS

BACKGROUND

Intervention or workovers on subsea equipment failures can be very expensive and time-consuming. If problems can be diagnosed and/or predicted before the system fails, a lot of operational expenditures could be saved from projects by planning interventions prior to system failures.

A hydraulic control system of subsea equipment is a key component whose integrity greatly impacts the functionality of a subsea production system. The failure of hydraulic control systems should be prevented or fixed as soon as possible by all means to ensure normal operation of the subsea production system. Some of the common failure modes associated with hydraulic control systems include, for example, supply/function tube or directional control valve (DCV) leaking, subsea filter clogging, accumulator pre-charge gas escaping, and actuator spring force and seal friction changing.

A conventional method of predicting subsea hydraulic failures relies on an operator who visually reviews valve signatures and tells about the system problems. The effectiveness of such manual diagnosis dependents largely on the experience of the operator; and even a skilled operator cannot always detect small changes in the valve signatures that occur over time or determine whether such changes are due to failing components or normal operation condition changes such as bore pressure and hence the associated spring force.

There exists a need for a hydraulic diagnostic tool. Such a tool should be designed to detect and diagnose failure modes of subsea hydraulic control system prior to failure to reduce intervention costs and production downtime. There also exists a need for a method for monitoring a communication system of a subsea system prior to failure to reduce intervention costs and production downtime.

SUMMARY

In the presently disclosed method for determining performance of a hydraulic control system, valve signatures, which comprise pressure readings recorded during actuator opening/closing from pressure sensors in the system, are recorded and then compared with simulated valve signatures to determine system parameters. Changes in the system parameters (discovered using the simulation) over time provide an indication of the health of the system, which can be used to make decisions on taking corrective actions.

Also provided is a method for determining problems in a hydraulic control system using the recharge portion of supply and function line valve signatures. An increased pressure differential between the supply and function line valve signatures with increased pressure indicates a leak, while the valve signatures being parallel indicates sensor drift.

Further provided is a method for determining whether a leak and/or clog exist in a hydraulic control system. Valve signatures are recorded from pressure sensors located in the supply and function lines in the system during system integration testing. An initial flow resistance, $Cv_0$, is calculated using the recorded valve signatures during system integration testing and actuator volume, $V_{act}$. Valve signatures are recorded from the pressure sensors during operation of the system. A value for $$\int_0^T Cv_0 \sqrt{dp} \, dt$$

is calculated during operation of the system, wherein dp is a pressure differential between the pressure sensors over time during operation of the system, and T is actuator (valve) opening time. If the integration value calculated is greater than $V_{act}$, it indicates leaking and/or clogging in the hydraulic control system.

Additionally provided is a method for monitoring a communication system of a subsea system comprising measuring a maximum amplitude of analog signals transmitted from the subsea control module to the topside modem and comparing the maximum amplitude of the analog signals transmitted from the subsea control module to the topside modem over time. Measuring the maximum amplitude of analog signals transmitted from the subsea control module to the topside modem can comprise reading digital signals transmitted from a master control station to the topside modem and identifying the subsea control module that receives analog signals from the topside modem based on the digital signals transmitted from the master control station to the topside modem. Further, a method for maintaining a communication system of a subsea control system comprises monitoring a communication system of a subsea control system as outlined above and preparing for maintenance if a comparison of the maximum amplitude of the analog signals transmitted from the subsea control module to the topside modem over time indicates a decrease in the maximum amplitude of the analog signals transmitted from the subsea control module to the topside modem over time.

The methods described herein provide accurate, dependable methods for analyzing performance of hydraulic control systems and prediction and prevention of hydraulic control system failures. In particular, the methods described herein provide accurate, dependable analytical methods for detection of leaking and/or clogging in hydraulic control flow lines using recorded pressure signals from, for example, subsea systems. Leaking (for example, of DCVs, actuators, and/or lines) and clogging (for example, of filters) are two of the major problems in hydraulic control flow lines. Analysis as well as prediction and/or early detection of leaking and/or clogging allows an opportunity for corrective actions before failures occur.

DETAILED DESCRIPTION

Introduction to the Control System

Figure 1:
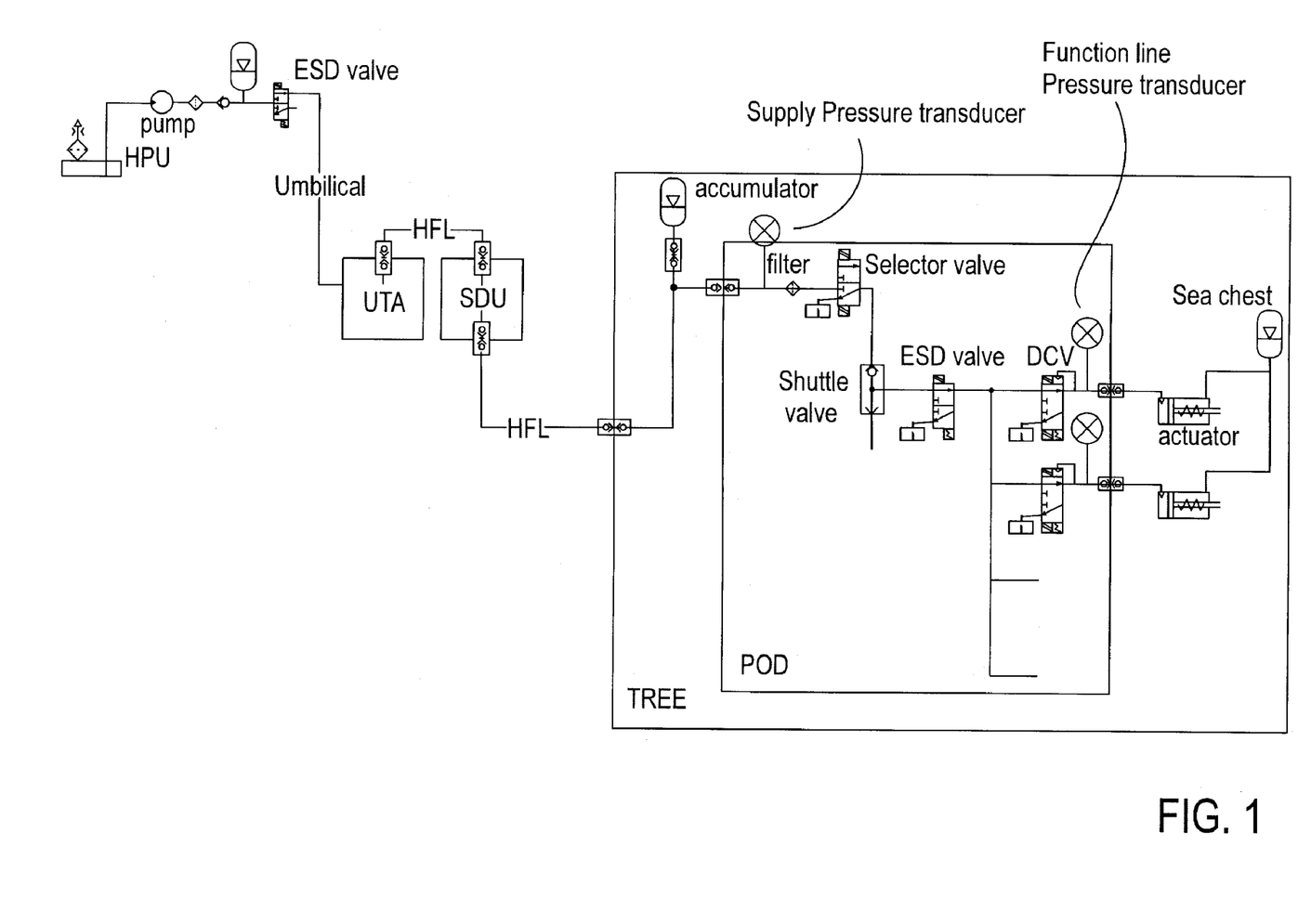
FIG. 1 shows an embodiment of an overall hydraulic control system for a subsea project.

FIG. 1 is a schematic of a generic hydraulic control system. On the topside, hydraulic fluid is pumped from a Hydraulic Power Unit (HPU) into an umbilical which terminates at an Umbilical Termination Assembly (UTA). For projects that have a long tieback, the control fluid should be modeled as compressible flow in the umbilical. Through a Subsea Distribution Unit (SDU), a series of tree valves are opened through DCVs controlled by a SCM. A subsea accumulator provides a local pressure source to help open valves faster and provide a cushion to absorb shocks and irregularities in the flow. Precharge gas leaking may cause the accumulator to lose its function, and therefore, can impact behavior of the entire hydraulic control system. Subsea filter(s) help maintain the cleanliness of hydraulic fluid. Dirty fluid may cause damage to flow passages and cause malfunction of, for example, solenoids valves. Actuators, used to open valves, are another potential point of failure, associated with the decrease of spring force and seal friction change.

Figure 2:
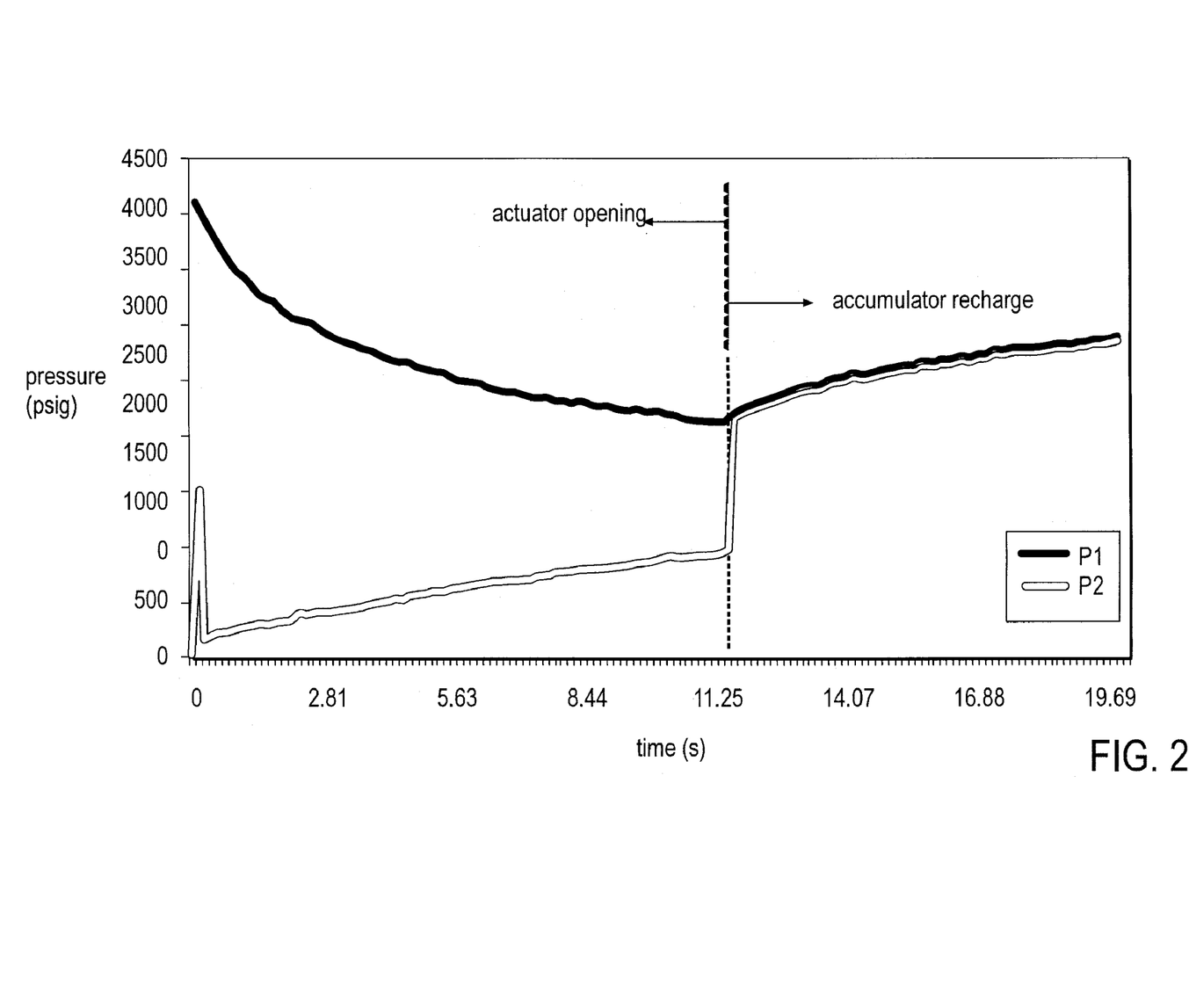
FIG. 2 shows typical valve signatures for a non-leaking system during actuator opening and accumulator recharge.

At least one pressure transducer (i.e., a function line pressure transducer) mounted in the SCM downstream of the DCV records pressure signal changes during opening and closing of the valve. The recorded pressure signal changes are collectively referred to as a valve signature. A valve opening signature usually involves two processes: (1) actuator opening, and (2) accumulator recharge, as shown in FIG. 2. In some cases, there are two pressure sensors located in the SCM (or POD), i.e., a supply pressure sensor and a function line pressure sensor. The location of the supply pressure sensor may vary in SCMs manufactured by different vendors. For example, the supply pressure sensor can be upstream of the filter as shown in FIG. 1. The two sensors record pressure signals simultaneously during valve opening (only the function line sensor records the valve signature during closing of the valve) and the recorded data is stored in a master control station (MCS) and can be accessed from topside on demand.

A hydraulic control system failure is usually associated with the pressure downstream of the DCV dropping below the DCV latching pressure, which is called DCV dropout pressure. When this happens, the DCV is deactivated and vents the control fluid into the environment, thus maintaining the safety of the entire control system. Most of the failure modes considered have the potential to cause the pressure to drop below DCV dropout pressure.

Generic Diagnostic Method

The valve signature during opening/closing is a complex function of the configuration of the hydraulic flow line components and the properties of the hydraulic control fluid. The configuration of the hydraulic flow line components includes such variables as, for example, topside pressure source condition, umbilical length, inside diameter, thickness, accumulator size and pre-charge, flow restrictions and actuator size, and related forces. Control fluid properties include, for example, density, viscosity and bulk modulus.

For a project with most of the system parameters known within relatively small uncertainties, software, i.e., a simulation algorithm, can be used to generate a valve signature during opening/closing that matches a valve signature captured (i.e., recorded) in the field by changing variable parameters such as, for example, actuator spring force, accumulator pre-charge, SCM flow resistance value (Cv), etc. By tracking changes in the system parameters by comparing a series of valve signatures during opening/closing over time, a trend of changes in the system parameter over time can be revealed and system failure(s) or problem(s) can be forecasted. For example, a decrease in spring force indicates an actuator problem, a decrease in pre-charge pressure indicates pre-charge gas leaking from accumulator, and a decrease in SCM flow resistance value (Cv) indicates that the subsea filter clogging. Once problems are determined, corresponding measures can be taken prior to system failure(s).

Accordingly, provided is a method for monitoring the health of a hydraulic control system comprising capturing a layout and parameters of the hydraulic control system. Parameters of the hydraulic control system can include, for example, data on tubing, hydraulic fluid properties, supply pressure, accumulator, actuator and flow restrictions imposed by different equipment in the system. A valve signature is captured during a System Integration Test (which simulates zero bore pressure and zero sea depth). A simulated valve signature is generated to match the valve signature captured during the System Integration Test by using a simulation algorithm and adjusting parameters of the hydraulic control system. The parameters of the hydraulic control system used to generate the simulated valve signature that matches the valve signature captured during the System Integration Test are recorded. A valve signature for a subsea valve opening/closing (e.g., a first subsea valve opening/closing) is captured. A simulated subsea valve signature is generated to match the subsea valve signature captured for the subsea valve opening/closing by using the simulation algorithm and adjusting parameters of the hydraulic control system. The parameters of the hydraulic control system used to generate the simulated subsea valve signature that matches the valve signature captured for the subsea valve opening/closing are recorded. The three previous steps are repeated (e.g., for all subsequent subsea valve openings/closings). Changes in the parameters of the hydraulic control system are tracked over time.

Problems or issues with the hydraulic control system can be detected and/or predicted based on the changes in the parameters of the hydraulic control system over time. For the generic diagnostic method, changes in the system parameters relative to their initial state are the key to diagnosis. The absolute values of the simulated parameters are of secondary importance. Prediction of failure(s) allows an opportunity to prepare for intervention to minimize the impact of failure before failure occurs, for example, by ordering equipment, tools and/or scheduling an intervention vessel. Similarly, diagnosing a failure drastically shortens the intervention time.

Leaking and Clogging Detection Method

Figure 3:
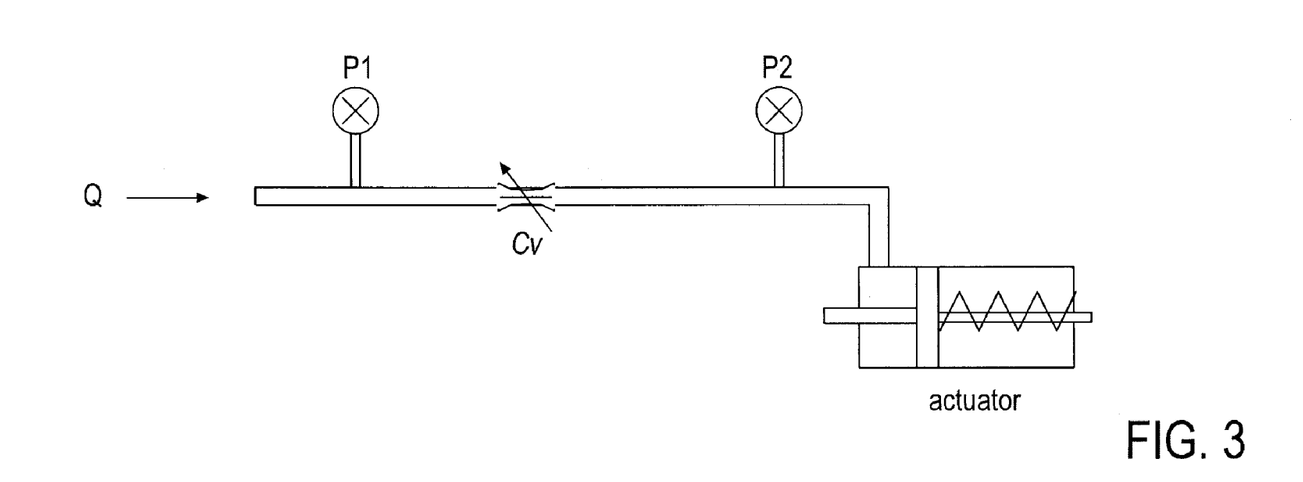
FIG. 3 is a schematic illustration of a subsea control module (SCM) portion of a hydraulic control system and its connection to an actuator.
Figure 4:
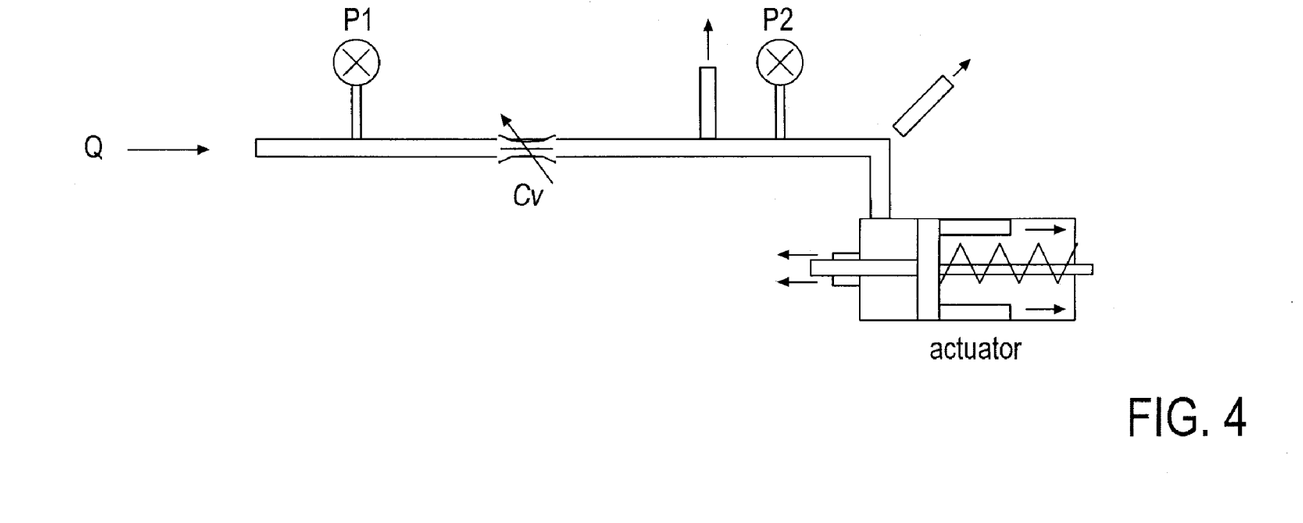
FIG. 4 is a schematic illustration of a SCM portion of a hydraulic control system and its connection to an actuator, wherein leaking is a problem.

The SCM portion of the system and its connection to an actuator are schematically illustrated in FIG. 3. In FIG. 3, P1 corresponds to the supply pressure transducer of FIG. 1; P2 corresponds to the function line pressure transducer of FIG. 1. Cv represents a cumulative flow resistance imposed by the equipment located between the two pressure sensors. Cv decreases during the lifetime of the system due to clogging in the equipment such as a filter. Upon deployment of the project, the initial flow resistance is $Cv_0$. After time, leaking may occur, as shown in FIG. 4. In particular, leaking, represented by the arrows, may occur from the DCV or other equipment between the pressure sensors, the line (illustrated in FIG. 4 between P2 and the actuator), and/or the actuator.

Figure 5:
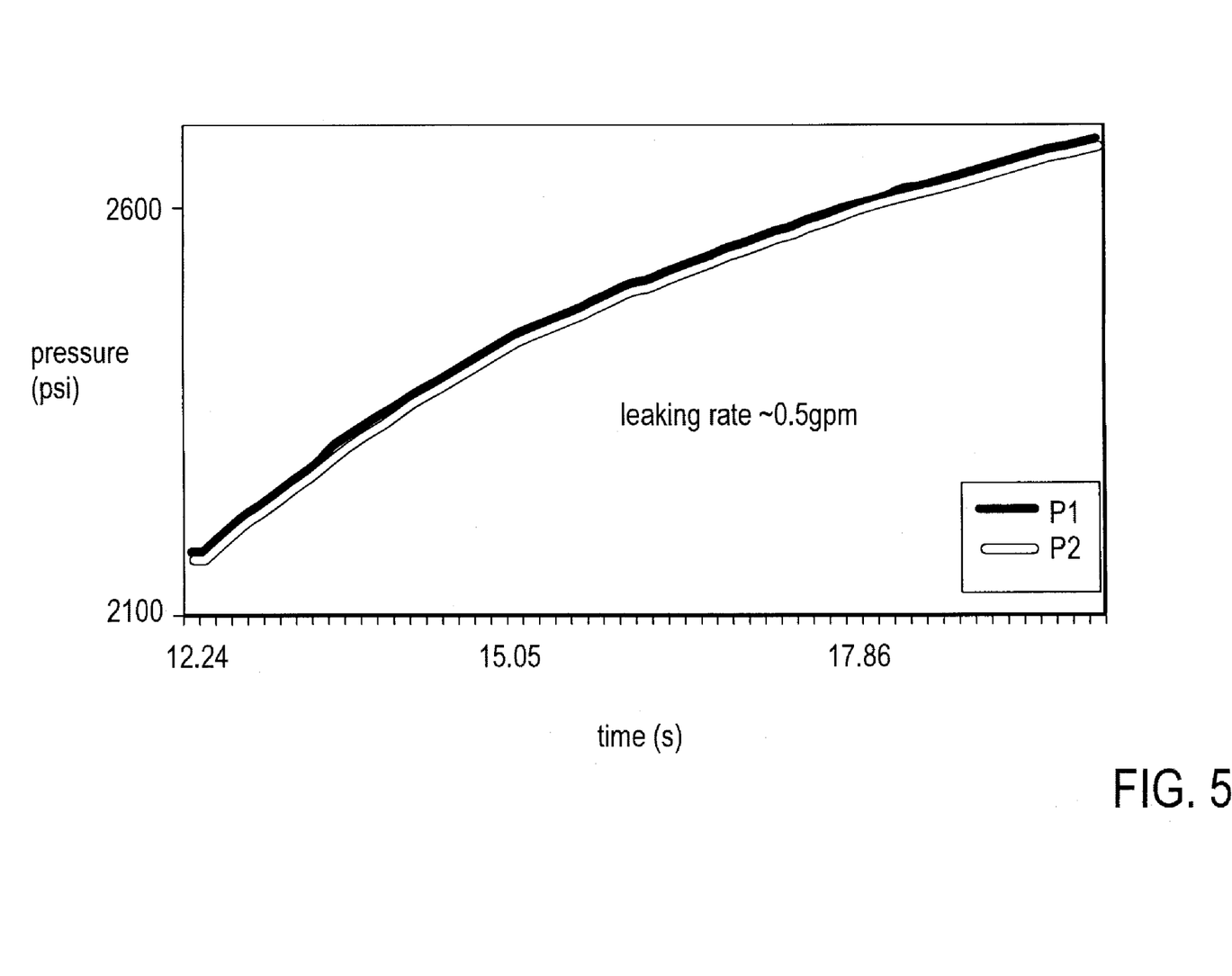
FIG. 5 is an enlarged view of valve signatures during accumulator recharge for a leaking hydraulic control system.

The valve signatures also provide information that can be used to detect subsea hydraulic control system leaks. During accumulator recharge, the pressure differential between P1 and P2 should be zero, i.e., when the actuator is fully opened, there is no pressure drop. On the contrary, a leak in the system is indicated by an increased pressure differential between P1 and P2 during accumulator recharge as the system is charged to higher pressure. A leak will worsen under high pressure. FIG. 5, an enlarged view of valve signatures during accumulator recharge for a leaking hydraulic control system, illustrates such an increased pressure differential as the system is charged to higher pressure.

If, during accumulator recharge, the pressure differential between P1 and P2 is not zero and does not increase as the system is charged to higher pressure, but is a constant non-zero value (i.e., the valve signatures of the pressure sensors are parallel during accumulator recharge), such valve signatures indicate sensor drift. As used herein, the phrase "sensor drift" refers to distortion of the output signal from the sensor that can occur gradually and incrementally over time, if the sensor is exposed to contamination, degradation, and/or temperature change.

More precisely, the leaking rate can be quantified. When the project is deployed, by means of mass conservation, the amount of control fluid that flows through the flow line during actuator opening is equal to the actuator volume. Thus, the initial flow resistance $Cv_0$ can be calculated using the valve signatures and the actuator volume ($V_{act}$) though Equation (1), where dp is the pressure differential ($P1(t)-P2(t)$) over time, and T is the actuator (valve) opening time.

$$Cv_0 = \frac{V_{act}}{\int_0^T \sqrt{dp}\, dt} \quad (1)$$

The units for actuator volume, pressure, and time are gallons, pounds per square inch (psi) and minutes, respectively. Integration of the denominator can be calculated using recorded valve signatures.

After some time, a leak may develop in the system. Assuming no clogging in the system, the leak volume, which is greater than zero, can be calculated using Equation (2).

$$V_{leak} = \int_0^T Cv_0 \sqrt{dp}\, dt - V_{act} \quad (2)$$

The integration term is calculated using recorded pressure valve signatures and $Cv_0$ from Equation (1).

On the other hand, Equation (3) can be used to calculate the leak volume during operation of the system, where Cv is the flow resistance with clogging, and $Cv<Cv_0$ (i.e., reduced flow as a result of clogging).

$$V_{leak} = \int_0^T Cv \sqrt{dp}\, dt - V_{act} \quad (3)$$

However, Cv cannot be measured or calculated, as can $Cv_0$, because there may be leaking in the system. Thus, in order to determine whether there is leaking and/or clogging in the hydraulic control system, Cv in Equation (3) may be replaced by $Cv_0$, as calculated from Equation (1). However, since $Cv<Cv_0$, a value for $$\int_0^T Cv_0 \sqrt{dp}\, dt$$

greater than $V_{act}$, indicates leaking and/or clogging in the hydraulic control system.

Referring again to Equation (2), and specifically the calculated value for $V_{leak}$, once it has been determined that the system has a leak and the leaking volume is quantified during opening of the valve, it can be determined whether the system is clogged. In particular, a value for $$\int_0^T Cv_0 \sqrt{dp}\, dt$$

greater than ($V_{act}+V_{leak}$), indicates clogging in the hydraulic control system in addition to leaking.

Both leaking (i.e., $V_{leak}$) and clogging (i.e., Cv) terms are present in the governing Equation (3). In order to only determine whether there is leaking in the system (i.e., exclude the issue of potential clogging), the pressure sensors can be located such that there is not a filter (i.e. the most common cause of clogging) between the pressure sensors, such that the flow resistance between the two pressure sensors remains a constant $Cv_0$, as determined when the project is just deployed or during system integration testing (during a System Integration Test). The leak volume during actuator opening can be determined using Equation (2) and an average leak rate can be calculated by dividing the leak volume with the actuator opening time. As mentioned earlier, the leak rate might increase when the system is pressurized at higher pressure.

Accuracy of the pressure sensors is an important factor in use of the above equations to determine leaking in the system. In particular, a margin of error for the leak volume should be calculated based on accuracy of the pressure sensors. For example, assuming a known pressure sensor uncertainty of 0.1%, constant $Cv_0$, $P1_{max}=P2_{max}=5000$ psi, and $dp_{min}=100$ psi (i.e., typical minimum pressure differential), the margin of error in leak volume, $V_{leak}$, is calculated to be about 5%.

In an embodiment, performance of a hydraulic control system is maintained by determined whether a leak exists in the hydraulic control system and performing maintenance on the hydraulic control system if the leak volume exceeds a predetermined amount. The predetermined amount may be dependent on the margin of error in the leak volume.

The minimum average detectable leak rate detectable can be calculated using Equation (4), with u being the uncertainty of the integration term.

$$(Rate_{leak})_{min} = \left(\frac{V_{leak}}{T}\right)_{min} = \left(\frac{\int_0^T Cv_0 \sqrt{dp}\, dt - V_{act}}{T}\right)_{min} = \frac{u}{1-u} \cdot \frac{V_{act}}{T} \quad (4)$$

For example, if the uncertainty of the integration term (u) is 5%, as noted above, the actuator volume ($V_{act}$) is 1 gallon, and the actuator (valve) opening time (T) is 120 seconds, then the minimum average leak rate detectable is 0.0263 gallons per minute (1.6 cc/sec).

In summary, a method for determining whether a leak and/or clog exists in a hydraulic control system comprises recording valve signatures from pressure sensors in the system during system integration testing. An initial flow resistance, $Cv_0$, is calculated using the recorded valve signatures during system integration testing and actuator volume, $V_{act}$. Valve signatures are recorded from the pressure sensors during operation of the system. A value for $$\int_0^T Cv_0 \sqrt{dp}\, dt$$

is calculated during operation of the system, wherein dp is a pressure differential between the pressure sensors over time during operation of the system, and T is actuator (valve) opening time. A calculated value for $$\int_0^T Cv_0 \sqrt{dp}\, dt$$

greater than $V_{act}$ indicates leaking and/or clogging in the hydraulic control system.

The methods described herein can be used in conjunction with computer storage and/or computer-readable medium. In particular, reference to "capturing" and "recording" as used herein can refer to recording on computer storage and/or computer-readable medium. Further, as noted above, the simulation algorithm software can be executed by a computer containing the computer storage and/or computer-readable medium.

Introduction to the Communication System

Figure 6:
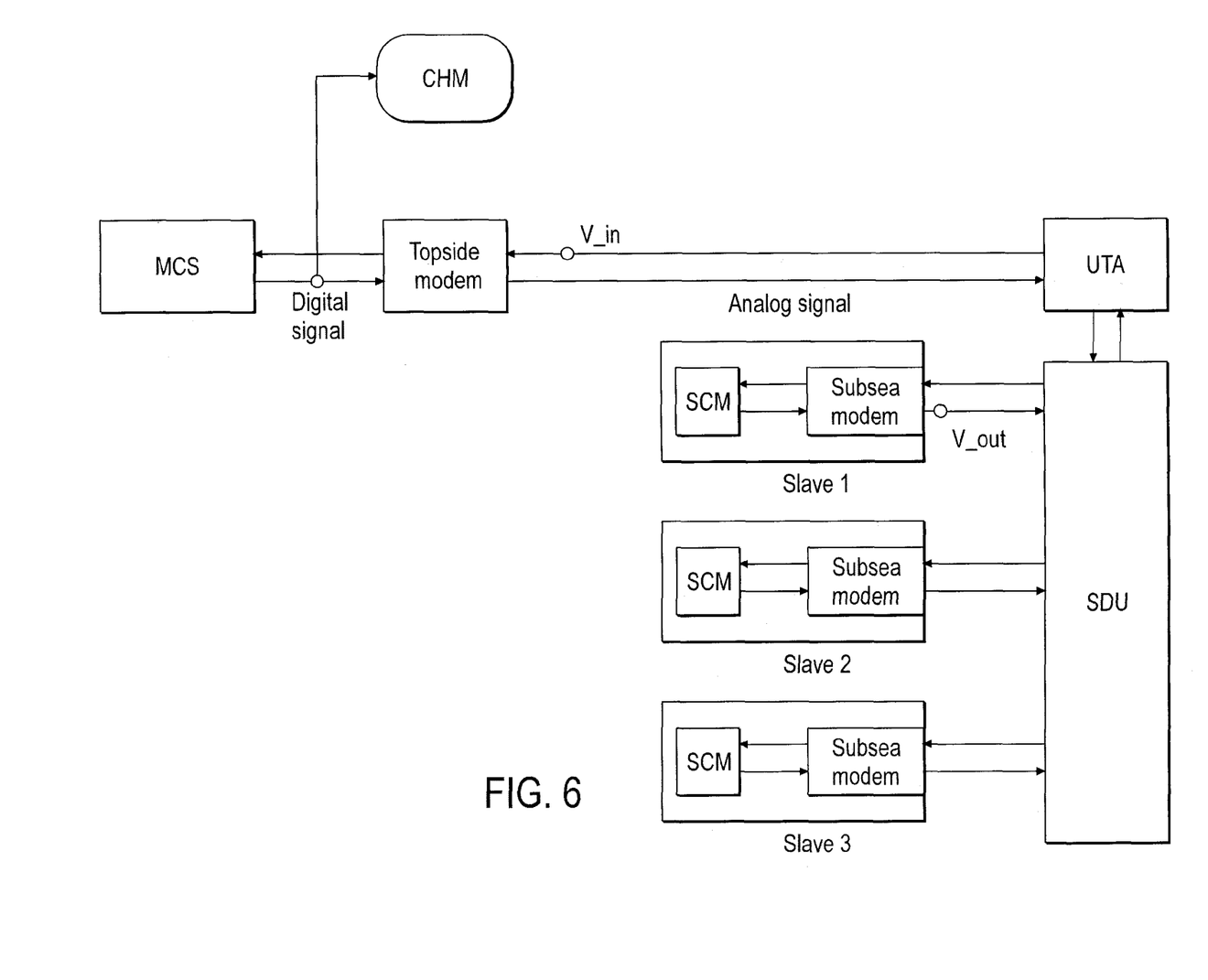
FIG. 6 shows a typical communication system in a subsea production control system.

FIG. 6 shows a typical communication system in a subsea production control system. The MCS is the "master" that initiates and controls the communication transmission. The MCS generates commands, sends the commands out to SCMs, and receives status signals back from the SCMs. The SCMs are "slaves" that receive the commands, execute the commands, and generate status signals for the MCS.

Modems are used to modulate/demodulate the signals transmitted between the MCS and SCMs. There are subsea modems associated with the SCMs and a topside modem associated with the MCS. Modems greatly extend the communication range by modulating and demodulating signals and transmitting the signals in analog form.

Each SCM has a unique address. A SCM does not execute commands from the MCS unless the commands contain the unique address of the SCM. Once the SCM executes the command, the SCM generates a digital response which is converted to an analog signal by the subsea modem and sent back to the MCS. The topside modem receives the analog signal and converts the analog signal back into digital signal that is used by the MCS.

Communication Diagnostic Method

Among the most common problems that develop in a communication system are changes in the AC resistance (i.e., in any of the frequency related components) of the communication transmission line. Potential sources of such problems may include, for example, cable insulation failure in umbilical or flying leads, conductor (copper) creep in umbilical, corrosion of connector pins or splice points, and sea water ingress into connectors or electronic housing (e.g., SCM electronic housing).

The signal strength can be measured in terms of the maximum amplitude of the analog signals received by the topside modem and varies based on the AC resistance of the communication transmission line. If the AC resistance of the line becomes larger, the signal strength received at the topside modem becomes weaker. Analog signal loss (degradation) can be measured in Decibels as follows.

$$\text{Decibel} = 20 \times \log \frac{V_{in}}{V_{out}} \quad (5)$$

where, as denoted in FIG. 6, $V_{out}$ is the amplitude of the analog signal sent out from the subsea modem and $V_{in}$ is the amplitude of the analog signal received by the topside modem. For a fiber optic communication system, $V_{in}$ and $V_{out}$ can be recorded as laser light intensity. In Equation (5), $V_{in}$ and $V_{out}$ can be recorded as the peak value (maximum amplitude) of the analog signals of voltage or laser light intensity. Since the output signal from the subsea modem is constant and known, the input signal measured at the topside modem can be used to monitor the signal losses from the SCM responses.

The communication health monitor (CHM), which can be located on the topside, can read the digital signal sent out by the MCS to identify with which SCM the MCS is communicating. Thereafter (e.g., after a couple of seconds), the CHM reads the analog response signal sent back from the SCM and measures the maximum amplitude of the analog response. The information read/measured by the CHM is sent back to MCS and can be accessed from the MCS on demand. The maximum amplitudes of the response signals can be compared over time, which can provide an indication of possible changes of the AC resistance of the communication lines. For a multi-SCM system, information from different slave SCMs (i.e., read/measured by the CHM) can also help to identify the location(s) of potential sources of problems.

While various embodiments have been described, it is to be understood that variations and modifications may be resorted to as will be apparent to those skilled in the art. Such variations and modifications are to be considered within the purview and scope of the claims appended hereto.

What is claimed is:

1. A method for monitoring the health of a hydraulic control system comprising:
    a) capturing a layout and parameters of the hydraulic control system;
    b) capturing a valve signature during a System Integration Test;
    c) generating a simulated valve signature to match the valve signature captured during the System Integration Test by using a simulation algorithm and adjusting parameters of the hydraulic control system;
    d) recording the parameters of the hydraulic control system used to generate the simulated valve signature that matches the valve signature captured during the System Integration Test; subsequent to steps c to d:
    e) capturing a valve signature for a subsea valve opening/closing;
    f) generating a simulated subsea valve signature to match the subsea valve signature captured for the subsea valve opening/closing by using the simulation algorithm and adjusting parameters of the hydraulic control system;

g) recording the parameters of the hydraulic control system used to generate the simulated subsea valve signature that matches the valve signature captured for the subsea valve opening/closing;

h) repeating steps e), f) and g); and i) tracking changes in the parameters of the hydraulic control system over time.

2. The method of claim 1, further comprising detecting problems with the hydraulic control system based on the changes in the parameters of the hydraulic control system over time.

3. The method of claim 1, wherein the parameters of the hydraulic control system include data on tubing, hydraulic fluid properties, supply pressure, accumulator, actuator and flow restrictions imposed by different equipment in the system.

4. The method of claim 1, wherein the parameters of the hydraulic control system are selected from the group consisting of line length, line inside diameter, line wall thickness, line wall roughness, source pump pressure, accumulator volume, accumulator pre-charge, actuator volume, spring force, flow resistance imposed by equipment, hydraulic fluid properties, and directional control valve drop-out pressure.

5. The method of claim 1, wherein the system comprises a subsea directional control valve, and further wherein the valve signature comprises pressure readings recorded during opening or closing of the actuator.

6. A method for maintaining performance of a hydraulic control system comprising:
   a) monitoring the health of the system according to the method of claim 1; and
   b) performing preventative maintenance on the system based on analyzed performance of the system.

7. The method of claim 1, wherein steps (b) and (e) comprise recording valve signatures comprising pressure readings recorded during accumulator recharge from pressure sensors; and further comprising comparing the valve signatures, wherein:
   an increased pressure differential of the valve signatures with increased pressure indicates a leak; and
   the valve signatures being parallel indicates sensor drift.

8. The method of claim 1, wherein step (b) comprises recording valve signatures from pressure sensors in the system during system integration testing, and further comprising:
   calculating an initial flow resistance, $Cv_0$, using the recorded valve signatures during system integration testing and actuator volume, $V_{act}$;
   recording valve signatures from the pressure sensors during operation of the system; and
   calculating a value for $$\int_0^T Cv_0 \sqrt{dp}\, dt$$

during operation of the system, wherein dp is a pressure differential between the pressure sensors over time during operation of the system, and T is actuator opening time;
wherein a calculated value for $$\int_0^T Cv_0 \sqrt{dp}\, dt$$

greater than $V_{act}$ indicates leaking and/or clogging in the hydraulic control system.

9. A method for maintaining performance of a hydraulic control system comprising:
   a) determining performance of the system according to the method of claim 7; and
   b) performing maintenance on the system if a comparison of the valve signatures indicates a leak or sensor drift.

10. The method of claim 8, wherein calculating $Cv_0$ comprises using the equation:

$$Cv_0 = \frac{V_{act}}{\int_0^T \sqrt{dp}\, dt}.$$

11. A method for monitoring the health of a hydraulic control system comprising:
   determining whether a leak and/or clog exists in a hydraulic control system according to the method of claim 8; and
   performing maintenance on the system if calculating a value for $$\int_0^T Cv_0 \sqrt{dp}\, dt$$

indicates leaking and/or clogging in the hydraulic control system.

12. The method of claim 8, wherein there is not a filter located between the pressure sensors.

13. The method of claim 8, further comprising calculating a leak volume in the system using the equation:

$$V_{leak} = \int_0^T Cv_0 \sqrt{dp}\, dt - V_{act}.$$

14. The method of claim 8, further comprising calculating a margin of error for the leak volume based on accuracy of the pressure sensors.

15. The method of claim 8, wherein a calculated value for $$\int_0^T Cv_0 \sqrt{dp}\, dt$$

greater than $V_{act}$ plus the leak volume in the system indicates clogging in the hydraulic control system.

16. A method for maintaining performance of a hydraulic control system comprising:
   determining whether a leak exists in a hydraulic control system according to the method of claim 14; and
   performing maintenance on the system if the leak volume exceeds a predetermined amount.

* * * * *